No. 671,366.  
G. M. BRODIE.  
ADJUSTABLE PIPE COUPLING.  
(Application filed Dec. 22, 1900.)
(No Model.)
Patented Apr. 2, 1901.
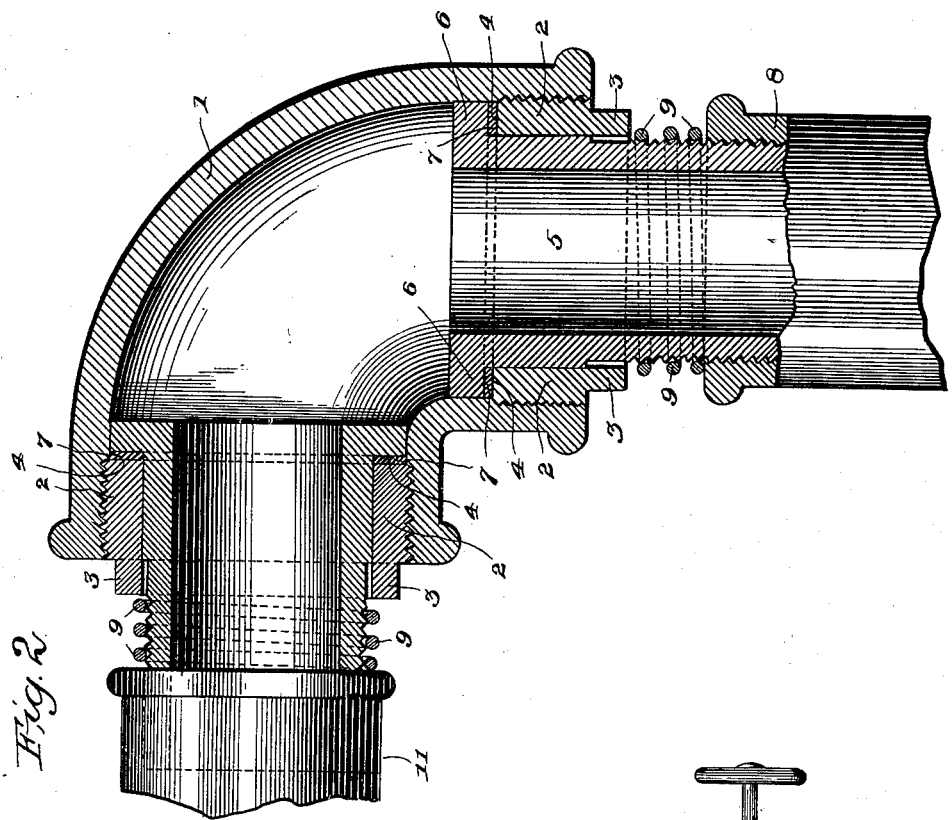
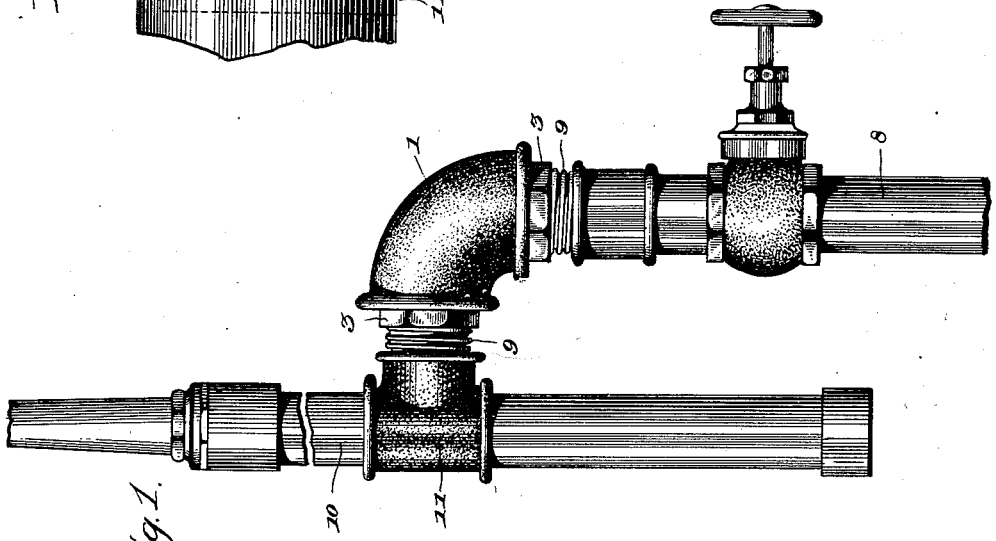
Witnesses  
G. M. Brodie, Inventor  
by C. A. Snow & Co.  
Attorneys

UNITED STATES PATENT OFFICE.

GEORGE MAXWELL BRODIE, OF ANGELS CAMP, CALIFORNIA.

ADJUSTABLE PIPE-COUPLING.

SPECIFICATION forming part of Letters Patent No. 671,366, dated April 2, 1901.

Application filed December 22, 1900. Serial No. 40,790. (No model.)

*To all whom it may concern:*

Be it known that I, GEORGE MAXWELL BRODIE, a citizen of the United States, residing at Angels Camp, in the county of Calaveras and State of California, have invented a new and useful Adjustable Pipe-Coupling, of which the following is a specification.

This invention relates to pipe-couplings, and has for its object to provide an improved device of this character which is adjustable so as to bring the adjacent pipe-sections into different relations and also to insure a tight joint between the adjustably-movable parts of the device, so as to facilitate the adjustment thereof and at the same time prevent leakage.

It is furthermore designed to employ the present invention as a coupling between a discharge-nozzle and a supply-pipe, so as to secure a wide range of adjustment for directing the discharge of the nozzle in any direction.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of the improved coupling employed to connect a discharge-nozzle to a supply-pipe. Fig. 2 is an enlarged detail longitudinal sectional view taken through an elbow having its opposite ends provided with the present form of coupling.

Like characters of reference designate corresponding parts in both figures of the drawings.

Referring particularly to Fig. 2 of the drawings, 1 designates an ordinary elbow having its opposite ends interiorly screw-threaded. As both ends of the elbow have the identical form of coupling, a description of one is deemed sufficient. Detachably fitted to each end of the elbow is an externally-screw-threaded bushing 2, which is provided at its outer end with a slightly-reduced angular wrench-collar 3, that normally projects beyond the adjacent end of the elbow, so as to be conveniently accessible for applying or removing the bushing and also for adjusting the latter into or out of the elbow for the purpose of adjusting the position of the inner annular shoulder 4, formed by the inner end of the bushing.

Before fitting the bushing to the elbow a tubular gland 5 is introduced into the open end of the elbow, said gland being of shorter diameter than the interior of the elbow and having an outer marginal circular flange 6, which loosely fits the interior walls of the elbow. The external intermediate portion of the gland is smooth, and the bushing is slipped over the outer end of the gland and then engaged with the interior screw-threads of the elbow, so as to swivel the gland upon said elbow. A suitable packing-ring 7 is interposed between the inner end of the bushing and the flange or rim of the gland, so as to secure a tight joint therebetween. The outer end portion of the gland is externally screw-threaded for connection with a suitable pipe-section 8, and a helical spring 9 encircles the gland and bears in opposite directions against the opposite ends of the pipe-section and the bushing, which latter is, in effect, the end of the elbow. By this arrangement the tension of the spring normally and yieldingly holds the flange of the gland seated against the inner annular shoulder 4 of the elbow, so as to prevent leakage, while at the same time the elbow may be turned upon the pipe, and vice versa. Moreover, the spring permits of a slight slidable movement of the elbow upon the gland, so as to compensate for expansion of the elbow and the pipe-section.

In the application of the present form of coupling, as shown in Fig. 1 of the drawings, the pipe 8 is a water-supply pipe and is normally fixed, the elbow 1 being employed to connect the discharge-nozzle 10 to said supply-pipe. It is preferred to connect the intermediate portion of the nozzle to the adjacent end of the elbow by means of a T-coupling 11, so as to secure a lateral inlet into the nozzle and to permit of the lower end thereof being weighted, whereby the nozzle is normally maintained in a substantially upright position, with the discharge end uppermost. It will now be apparent that the elbow may be swung laterally in a circle about the fixed pipe as a center and in a horizontal plane, and the nozzle may be swung in a vertical plane about the adjacent end of the elbow as a center, thereby securing adjustments in planes at right angles and in complete circles.

It will be understood that the present invention is not confined to right-angled elbows nor to elbows alone, as it may be applied to a straight tubular member. Also by having the adjustable bushing the gland may be adjusted into or out of the end of the coupling, so as to accommodate the gland to the distance between the adjacent ends of the coupling member and the pipe-section.

What is claimed is—

1. A pipe-coupling, comprising a tubular member, having an inner annular shoulder, a rotatable gland projecting outwardly through one end of the tubular member, snugly fitting the inner marginal edge of the shoulder, having an outer marginal flange located at the inner edge of the shoulder, and its outer projected end formed for connection with a pipe, and a helical spring encircling the projected end of the gland and bearing against the adjacent end of the tubular member, whereby the gland is longitudinally yieldable within the said tubular member, the interior of the latter being free from projections adjacent to the inner end of the gland.

2. A pipe-coupling, comprising a tubular member, having its opposite ends interiorly screw-threaded, opposite externally-screw-threaded bushings removably fitted to the respective ends of the member and forming inner annular shoulders, the outer portions of the bushings being normally projected and formed into angular wrench-collars, opposite tubular glands, which are rotatable within the respective bushings, and have outer marginal flanges seated against the inner ends of the bushings, the outer ends of the glands being projected and externally screw-threaded, and helical springs encircling the projected portions of the respective glands and bearing against the adjacent ends of the tubular member.

In testimony that I claim the foregoing as my own I have hereto affixed my signature in the presence of two witnesses.

GEORGE MAXWELL BRODIE.

Witnesses:
JOHN DAVEY,
JOHN H. CARLEY.